US008438780B1

(12) United States Patent
Malavenda

(10) Patent No.: US 8,438,780 B1
(45) Date of Patent: May 14, 2013

(54) BOUQUET MAKING APPARATUS AND METHOD

(75) Inventor: George Malavenda, Key Biscayne, FL (US)

(73) Assignee: NF Global, Key Biscayne, FL (US)

( * ) Notice: Subject to any disclaimer, the term of this patent is extended or adjusted under 35 U.S.C. 154(b) by 0 days.

(21) Appl. No.: 13/457,629

(22) Filed: Apr. 27, 2012

(51) Int. Cl.
*A01B 79/00* (2006.01)
*A01G 5/00* (2006.01)
*A01G 7/00* (2006.01)

(52) U.S. Cl.
USPC ................................. 47/58.1 CF; 47/41.01

(58) Field of Classification Search .......... 47/41.01, 47/41.12, 41.13, 41.11, 58.1 CF; 248/27.8; 428/17, 23, 27, 24; 206/423; *A47G 7/07; A01G 5/00, 5/02*
See application file for complete search history.

(56) References Cited

U.S. PATENT DOCUMENTS

| 903,227 | A | | 11/1908 | Pruden |
| 1,423,906 | A | | 7/1922 | Brettschneider |
| D97,712 | S | * | 12/1935 | Orben .......................... D11/147 |
| 2,686,989 | A | | 8/1954 | Dillon et al. |
| 3,659,709 | A | | 5/1972 | Bartlett, Jr. et al. |
| 4,157,681 | A | | 6/1979 | Akesson et al. |
| 4,401,020 | A | * | 8/1983 | Brux ............................... 100/7 |
| 5,157,899 | A | | 10/1992 | Tas |
| 5,244,700 | A | | 9/1993 | Banschick |
| 5,477,637 | A | | 12/1995 | Aldrich |
| 5,641,008 | A | | 6/1997 | Ellis |
| 5,683,762 | A | | 11/1997 | Banschick |
| 6,389,744 | B1 | * | 5/2002 | Pugh ................................. 47/47 |
| 6,457,276 | B1 | | 10/2002 | Masters |
| 7,096,623 | B2 | | 8/2006 | Cardamone et al. |
| 7,213,365 | B2 | * | 5/2007 | Van Zuylen ................. 47/41.01 |
| 2001/0034972 | A1 | | 11/2001 | Masters |
| 2004/0060231 | A1 | * | 4/2004 | Hawley ........................ 47/41.01 |
| 2006/0026895 | A1 | * | 2/2006 | Pravettoni ......................... 47/39 |
| 2006/0265951 | A1 | | 11/2006 | Foster |

FOREIGN PATENT DOCUMENTS

| DE | 10201947 A1 | * | 1/2002 |
| JP | 5-305915 | * | 11/1993 |
| JP | 11-29115 | * | 2/1999 |
| JP | 11-147510 | * | 6/1999 |
| JP | 2008-29217 | * | 2/2008 |
| WO | WO 02/082883 | * | 10/2002 |
| WO | WO 03/039241 | * | 5/2003 |

OTHER PUBLICATIONS

Wikipedia, Assembly-line, Jan. 6, 2011 http://en.wikipedia.org/wiki/Assembly_line [retrieved from internet Oct. 1, 2012].*

* cited by examiner

*Primary Examiner* — Andrea Valenti
(74) *Attorney, Agent, or Firm* — Dowell & Dowell, P.C.; Jorie L. Stroup

(57) ABSTRACT

A bouquet making apparatus comprises a plurality of bouquet forms movably supported at spaced locations along a conveying device. Each bouquet form includes fixed upper and lower stem supports that hold bouquet elements, such as flowers, at an angle with respect to vertical. As each bouquet maker travels along the conveying device, workers spaced along the conveying device sequentially insert sets of flowers into upper and lower stem supports until each bouquet maker hold a final bouquet set. Each of the final bouquet sets are removed from the bouquet form and secured with a fastener, thereby forming a plurality of twisted stem-type bouquets having a substantially identical design appearance.

12 Claims, 14 Drawing Sheets

BOUQUET MAKING APPARATUS AND METHOD

BACKGROUND OF THE INVENTION

1. Technical Field

The present invention pertains to the art of flower bouquet making, and more particularly, to an apparatus and method for making twisted mixed floral bouquets.

2. Background Art

Mixed floral bouquets have been traditionally arranged and secured by hand. Such a process is time consuming and makes it difficult for one or more individuals to generate multiple bouquets having a substantially identical design or appearance. This can be even more difficult when a twisted stem-type bouquet is desired. One attempt to aid a user in arranging flowers can be seen in U.S. Pat. No. 7,213,365. More specifically, the '365 patent describes a stationary table having top and bottom gratings through which flower stems are inserted. The gratings are rotated about a vertical axis with respect to one another such that the stems are shifted into a twisted wheat sheaf-like position. However, this stationary device cannot be readily utilized by more than one person at a time, and the twisting motion of the device can damage or break delicate floral stems. Further, the '365 device does not enable the mass production or high-volume creation of identically designed bouquet arrangements for mass sale. Therefore, there is seen to be a need in the art for an apparatus that provides for the simultaneous manufacturing of multiple, substantially identical bouquets having twisted, undamaged stems.

SUMMARY OF THE INVENTION

The present invention is directed to a bouquet making apparatus comprising a conveying device and a plurality of interchangeable bouquet forms movably supported by the conveying device. In a first embodiment, a continuous loop conveyor includes sprocket supports connected to a support rail at spaced intervals engaging with a drive belt to guide the drive belt around the support rail. Additionally, adjustable supports are provided for supporting the conveyor at a desired height. Sprockets on each of the bouquet forms engage the drive belt, causing the bouquet forms to slide along first and second tracks as the drive belt moves about the conveyor. In this way, bouquet forms are transported between work stations. The bouquet forms include upper and lower stem supports configured to removably support a plurality of flower stems at an angle with respect to vertical. In alternative embodiments, bouquet forms are mounted on a rotatable support, and the support rotates to transport the bouquet elements between work stations.

In use, bouquet elements, such as roses, greenery or the like, are arranged at each of a plurality of work stations spaced along the conveying device. At each station, a worker inserts a set of bouquet element stems into one of a plurality of stem holding arms and into one of a plurality of corresponding lower stem receiving portions of a bouquet form. The conveying system is activated to transport each bouquet form from one work station to the next. Workers spaced along the conveying device at each station will sequentially insert bouquet elements into each of the pairs of stem holding arms and lower stem receiving portions. This process is repeated until the desired number of stem holding arms and corresponding lower stem receiving portions are filled, thereby forming a final bouquet set in each of the bouquet forms. The final bouquet set is removed from the respective bouquet form and secured together with a ribbon or the like, thereby forming a plurality of twisted stem-type bouquets having a substantially identical design. The bouquet forms and arrangement of bouquet elements can be customized, allowing for a limitless variety of bouquet designs. Advantageously, stems of the final bouquet set do not need to be twisted, mechanically or by hand, into the correct position for a twisted-type bouquet, as the stems have already been correctly aligned by the bouquet form. Thus, the present apparatus and method allow for the customization and mass production of substantially identical twisted bouquets.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
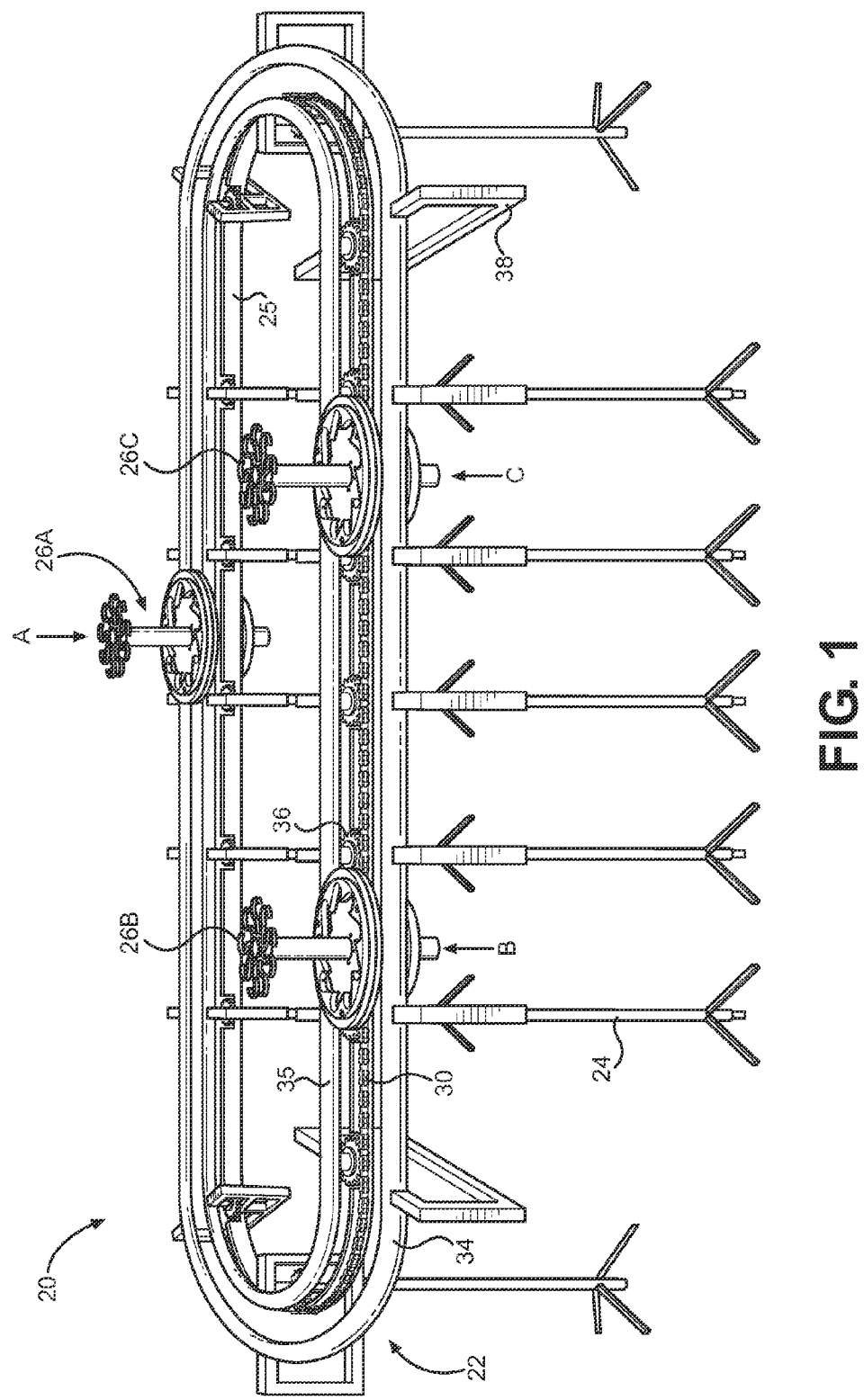
FIG. 1 is a perspective view of a bouquet making apparatus of the present invention with the drive system removed for clarity.
Figure 2:
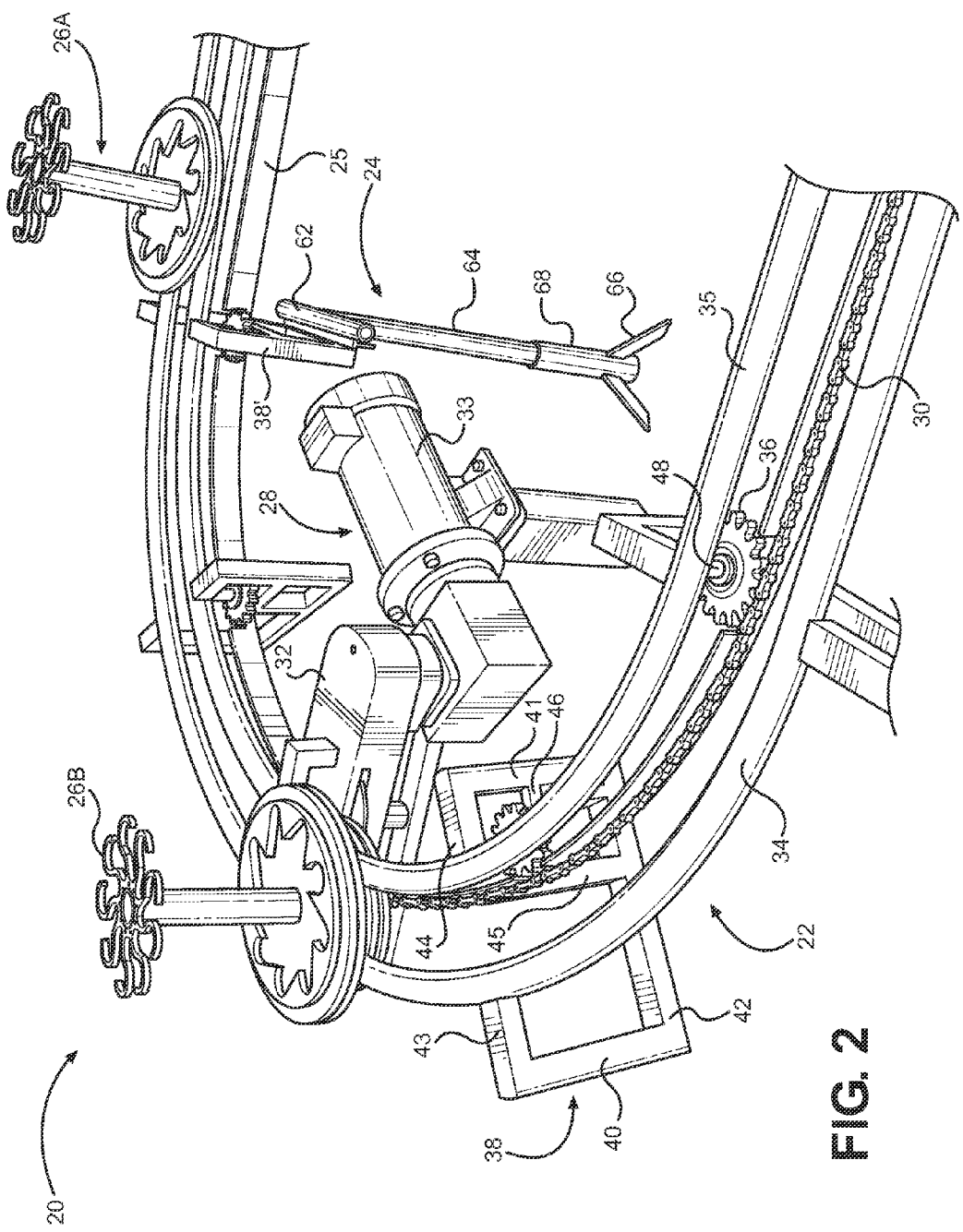
FIG. 2 is a partial perspective view of the bouquet making apparatus of FIG. 1 with the drive system shown.
Figure 3:
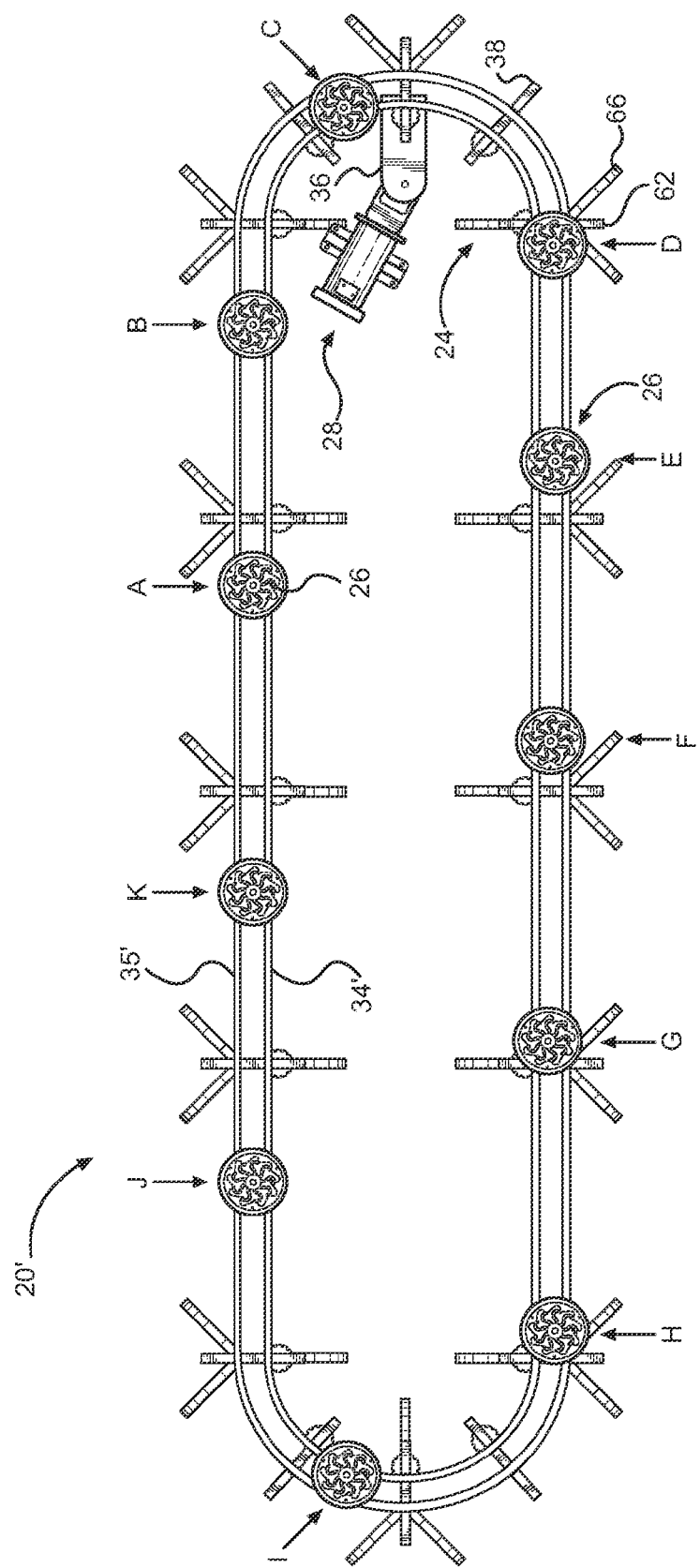
FIG. 3 is an alternative bouquet making apparatus.

With initial reference to a first embodiment shown in FIGS. 1 and 2, a bouquet making apparatus 20 of the present invention includes a conveying device in the form of a continuous loop conveyor 22 supported by a plurality of stands 24 connecting to a support rail 25. Pluralities of bouquet forms 26A-26C adapted to receive bouquet-making materials, such as flowers and greenery, are moveably supported by conveyor 22 and are selectively transported to various stations A-C via a drive system generally indicated at 28 in FIG. 2. More specifically, a drive belt 30 is transported around support rail 25 by a drive arm 32 connected to a motor 33. In an exemplary embodiment, drive belt 30 is in the form of a chain belt, which engages each of bouquet forms 26A-26C and transports them along first and second support tracks 34 and 35 of conveyor 22, as will be discussed in more detail below. Drive belt 30 is supported at spaced locations about conveyor 22 by sprockets 36 connected to sprocket supports 38. In the first embodiment, conveyor 22 is a continuous oblong or circular loop conveyor about which bouquet forms 26A-26C travel, however, conveyor 22 may take on any desired configuration. Although three bouquet forms 26A-C and three stations A-C are shown, it should be understood that bouquet making apparatus 20 can be configured with any desired number of bouquet forms and stations. For example, FIG. 3 depicts an alternative apparatus 20' including eleven identical bouquet forms generally indicated at 26 and eleven corresponding stations A-K arranged at spaced locations along first and second support tracks 34' and 35'. As with the previous embodiment 20, bouquet forms 26 are driven along tracks 34' and 35' by a drive system 28.

As best seen in FIG. 2, each sprocket support 38 includes first and second spaced vertical members 40 and 41 connected by a bottom member 42. Additionally, first and second top members 43 and 44 connect vertical members 40, 41 to respective first and second support tracks 34, 35. A central member 45 extends from bottom member 42 between vertical members 40 and 41 and connects sprocket support 38 to support rail 25. Further, a support arm 46 extends between second vertical member 41 and central member 45 to provide additional strength and stabilization for sprocket 36. Specifically, a gear shaft 48 extends between and is stabilized by second top member 44 and support arm 46, and rotatably supports sprocket 36 thereon. It should be understood that teeth extending from each of sprockets 36 engage drive belt 30 such that sprockets 36 rotate while supporting drive belt 30 as it travels around conveyor 22. As can best be seen in FIG. 2, each stand 24 incorporates a modified sprocket support 38' therein. Specifically, sprocket support 38' connects to a vertical support arm 62 of a post 64, which is supported by a plurality of feet 66 extending from a lower support portion 68. Preferably, post 64 is extendable, thereby enabling a user to adjust the height of conveyor 22.

Figure 4:
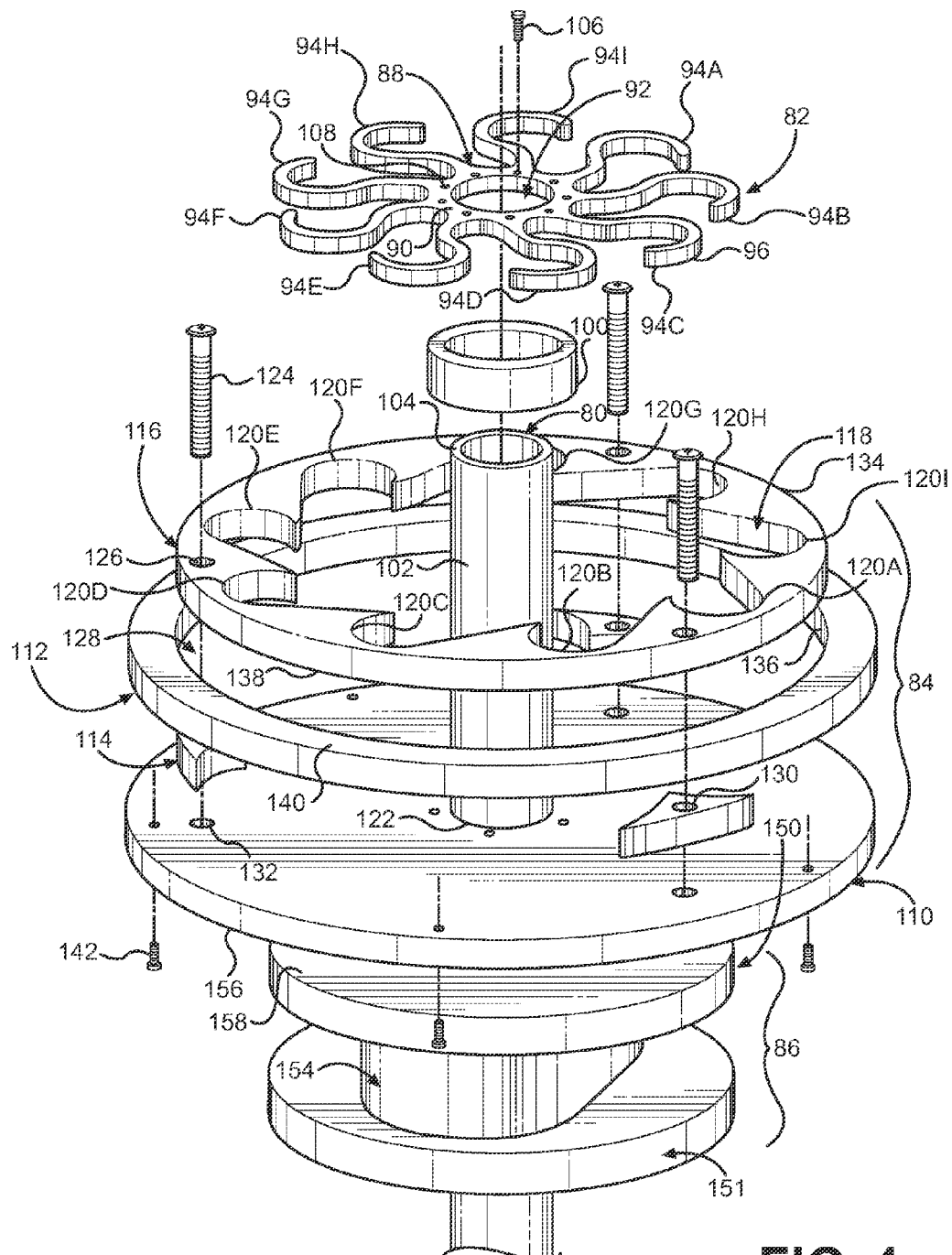
FIG. 4 is an exploded perspective view of a bouquet form of the present invention.
Figure 5:
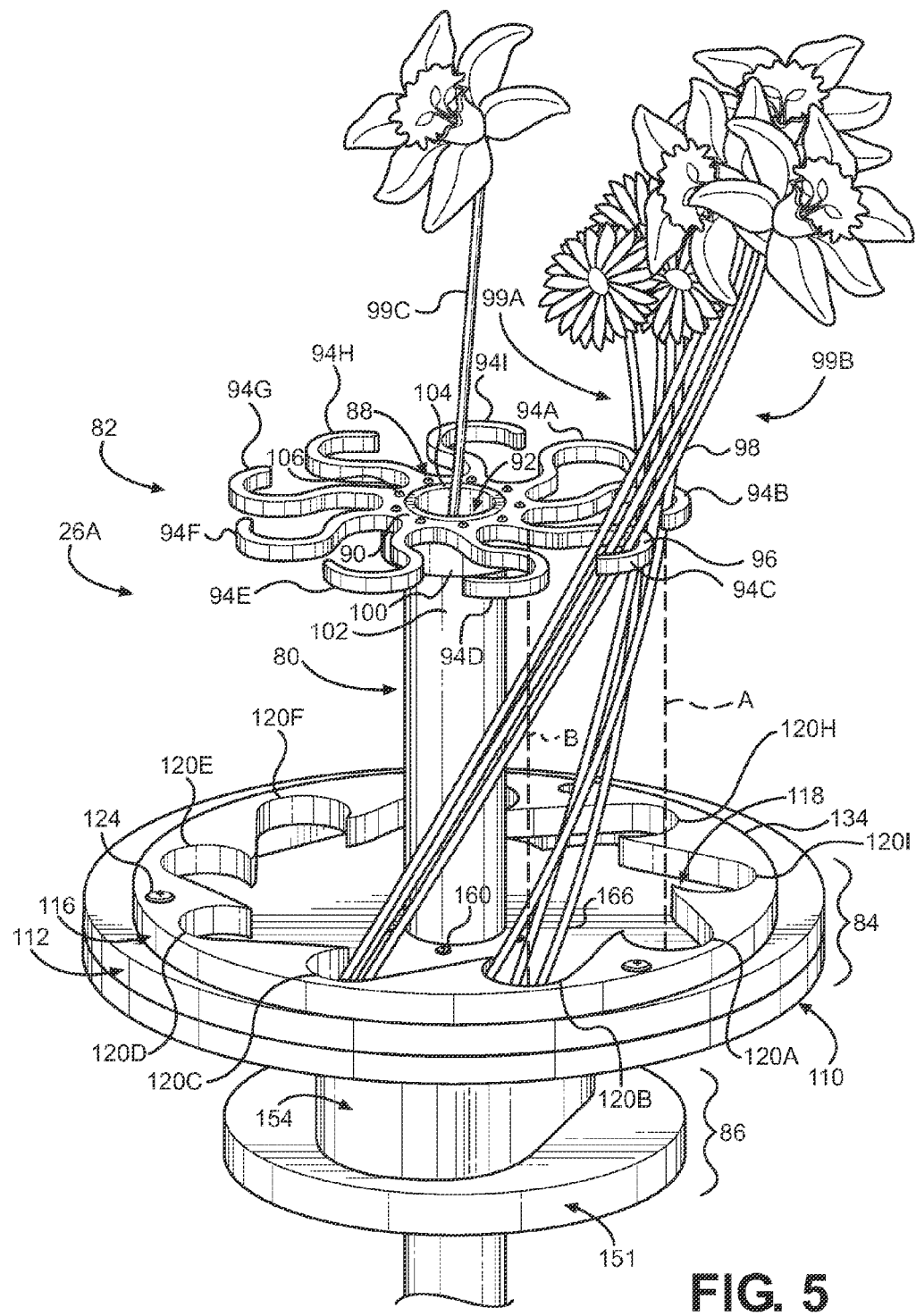
FIG. 5 is a perspective view of the assembled bouquet form of FIG. 4.

Bouquet forms of the apparatus will now be discussed in more detail with reference to bouquet form 26A shown in FIGS. 4 and 5. In general, each bouquet form 26A-26C includes a center post 80 about which is arranged an upper stem support 82, a lower stem support 84, and a conveyor engagement portion 86. Upper stem support 82 is preferably in the form of a plate 88 having a central body 90 with a center post receiving cutout 92 formed therein, and a plurality of stem holding arms or hook-shaped arms 94A-94I extending radially outward from central body 90. Each hook-shaped arm 94A-94I includes a curved or semi-circular portion 96 adapted to receive the stems 98 of a set of bouquet elements 99A, 99B. Preferably, center post 80 is also configured to receive and hold the stems 98 of a set of bouquet elements 99C. In the preferred embodiment shown, bouquet elements 99A, 99B are in the form of flowers, however, it should be understood that other common bouquet elements such as greenery and other decorative elements could also be utilized. In the context of this invention, a set can be a single flower or other bouquet element, but is preferably a plurality of bouquet elements. A collar 100 is fixed about an outer wall 102 of center post 80 such that an upper portion 104 of center post 80 extends above collar 100 and is received in center post receiving cutout 92 of upper stem support 82. Fasteners indicated at 106 extend through holes 108 in central body 90 and into collar 100, thereby securing upper stem support 82 to center post 80 in a fixed manner.

Lower stem support assembly 84 comprises a base plate 110, a central ring 112, a plurality of spacers 114 and a top plate 116 having a stem receiving cutout 118 formed therein. Stem receiving cutout 118 defines a plurality of curved stem receiving portions or lobes 120A-120I that define a pocket adapted to receive a plurality of floral stems, or the like, as shown in FIG. 5. Base plate 110 includes a post receiving aperture 122 therein, which fits about outer wall 102 of center post 80. Fasteners 124 extend through apertures 126 in top plate 116, through a central opening 128 in central ring 112, through apertures 130 in spacers 114, and into apertures 132 in base plate 110 to secure lower stem support assembly 84 together. With this configuration, an outer rim portion 134 of top plate 116 substantially aligns with an inner rim portion 136 of central ring 112, with spacers 114 supporting top plate 116 such that a bottom wall 138 of top plate 116 is substantially aligned with a top wall 140 of central ring 112. Additionally, fasteners 142 preferably extend up through base plate 110 into central ring 112 to further secure central ring 112.

Lower stem support assembly 84 is supported by conveyor engagement portion 86. More specifically, upper and lower platforms 150, 151 sandwich a track engaging member 154 there between. Upper and lower platforms 150, 151 and track engagement member 154 may be integrally formed with center post 80, or may be fixed about center post 80. A bottom wall 156 of base plate 110 is in contact with a top wall 158 of top platform 150. Fasteners 160 (shown in FIG. 5) may be utilized to secure base plate 110 to upper platform 150. With this configuration, lower stem support 84 and conveyor engagement portion 86 are rigidly fixed to center post 80.

Figure 6:
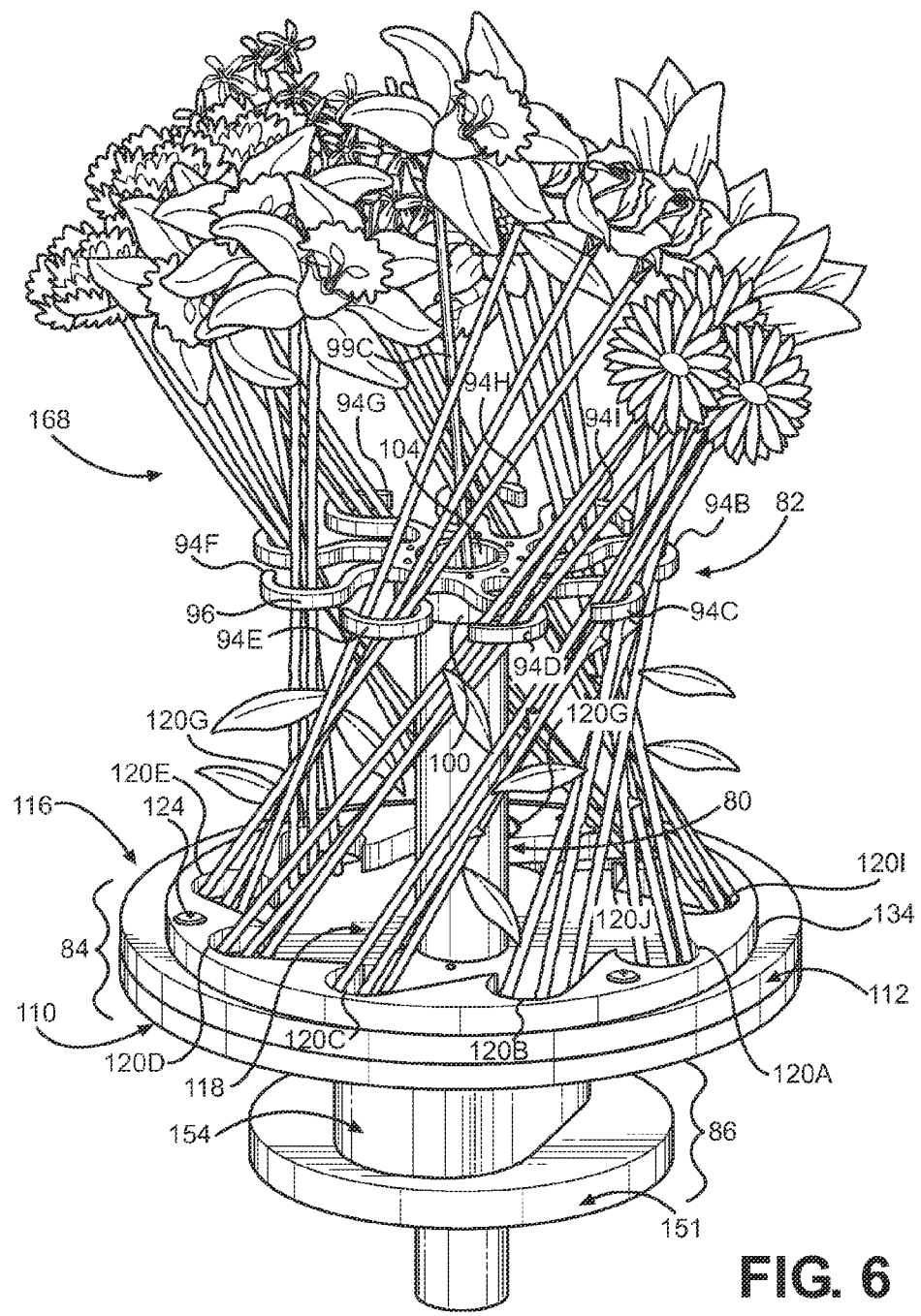
FIG. 6 is a perspective view of the bouquet form of FIG. 5 in use.
Figure 7:
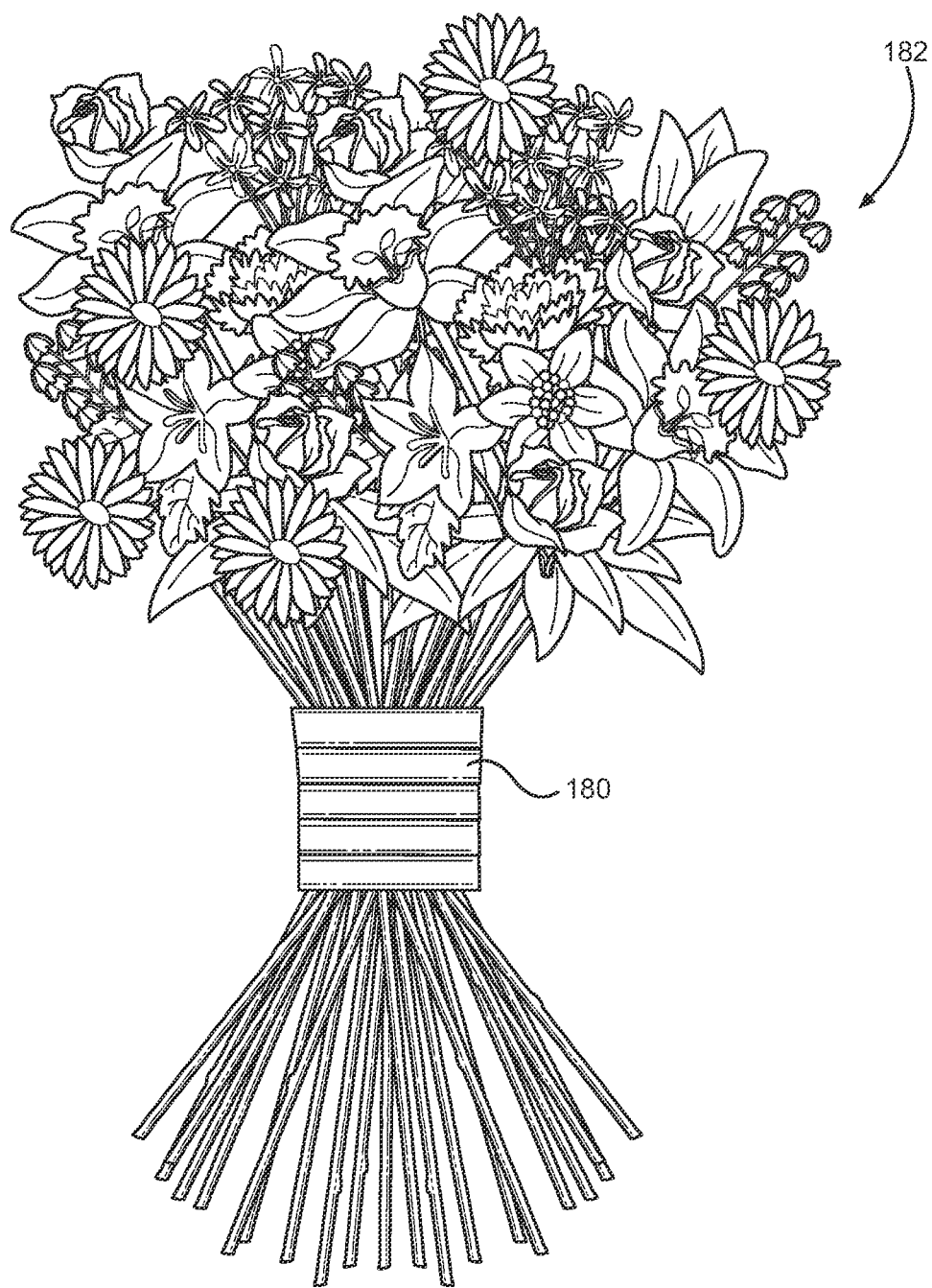
FIG. 7 depicts a bouquet made by the present invention.

Hook-shaped arms 94A-94I of upper stem support 82 are offset with respect to curved lobes 120A-120I of lower stem support assembly 84 such that stems 98 are removably held at an angle with respect to vertical by bouquet form 26A. In the preferred embodiment, center post 80 is substantially vertically aligned such that stems 98 held by upper and lower stem supports 82 and 84 are also held at an angle with respect to center post 80. With this configuration, upper stem support 82 and lower stem support 84 provide a bouquet element holding means for holding bouquet elements stems 98 at an angle such that stems 98 can be readily inserted and withdrawn from the bouquet element holding means during the manufacturing of a bouquet. Advantageously, stems 98 can be inserted and withdrawn from the bouquet element holding means without having to move or shift various parts of the bouquet form 26A. As can be seen in the example of FIG. 5, a first set of bouquet elements 99A is held within the curved portion 96 of hook-shaped arm 94C, while lower stem portions 166 of the first set of bouquet elements 99A are received within a corresponding one of the curved lobes 120C. A vertical axis A, which extends through the center of curved portion 96, is shown offset from a vertical axis B that extends through a center of curbed lobe 120C. The distance the vertical axes A and B are offset from one another can be varied, depending on the desired bouquet arrangement. In other words, the angle of stems 98 with respect to vertical can be adjusted by changing the relative positions of upper and lower stem supports 82 and 84. FIG. 6 depicts a filled bouquet form 26A, wherein each hook-shaped arm 94A-94I and corresponding curved lobe 120A-120I is filled with a set of bouquet elements, thereby forming a final bouquet set 168, which is ready for removal. The angled arrangement of parts results in a bouquet having stems 98 that cross one another and are intertwined, sometimes referred to in the industry as a Dutch spiral bouquet or a wheat sheaf-like bouquet. An example of such a twisted bouquet is depicted in FIG. 7.

Figure 8:
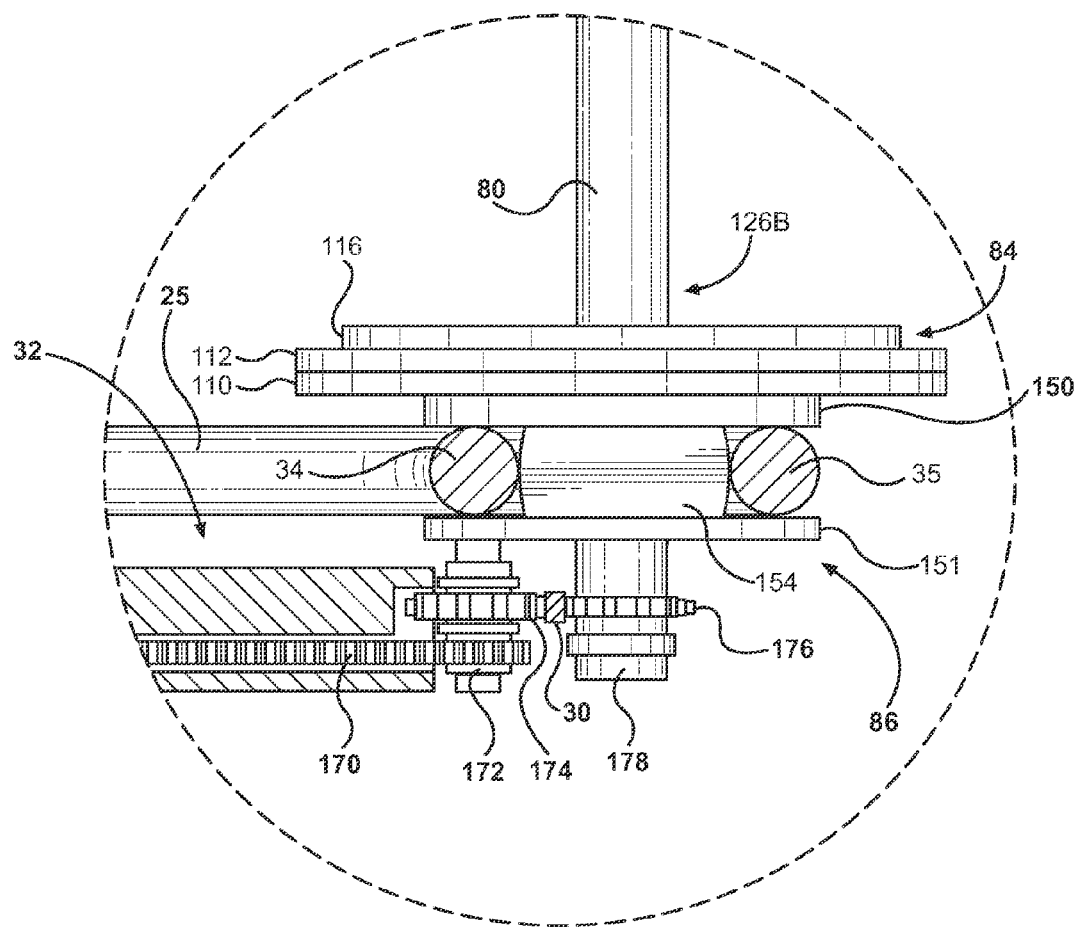
FIG. 8 is a partial cross-sectional view of the drive system of the present invention.

It should be appreciated that a variety of known drive systems could be utilized with the conveying device of present invention to transport bouquet forms 26A-26C. With reference to FIG. 8, bouquet form 26A is shown mounted to conveyor 22 through conveyor engagement portion 86. More specifically, bouquet form 26A is assembled such that upper and lower platforms 150 and 151 sandwich first and second support tracks 34 and 35, and engaging member 154 extends between first and second support tracks 34 and 35. A drive chain 170 of drive arm 32 is connected to motor 33 (depicted in FIG. 2) in a conventional manner, and engages a drive gear 172 to rotate drive gear 172 about a vertical axis. Drive gear 172 includes teeth 174, which engage with drive belt 30 such that the rotation of drive gear 172 moves drive belt 30 along support rail 25 of conveyor 22. A sprocket 176 attached about a lower portion 178 of center post 80 engages with drive belt 30, such that bouquet form 26A is moved about conveyor 22 by drive belt 30. With this configuration, bouquet form 26A can rotate freely about a vertical axis. In a preferred embodiment, surface areas of conveyor engagement portion 86 that come into contact with conveyor 22 are comprised of low friction materials, such as plastic, to enable bouquet form 26A to slide relatively freely along first and second support tracks 34 and 35.

A method of manufacturing bouquets will now be discussed with reference back to FIGS. 1 and 5. Initially, bouquet elements (not shown) are arranging at each of a plurality of stations A-C spaced along a conveying device, such as conveyor 22. For example, red roses can be arranged at station A, greenery can be arranged at station B and Baby's breath can be arranged at station C. In another example, each station A-C can have a different mix of flowers and/or greenery. The number and type of bouquet elements will depend on the desired design of the final bouquet. At a first of the plurality of stations, e.g. station A, a worker inserts a first set of bouquet element stems (e.g., 99A) into one of the plurality of stem holding arms 94A-94I and into one of the plurality of corresponding lower stem receiving portions 120A-120I of a first bouquet form (e.g., 26A) such that the first set of bouquet element stems 99A is held at an angle with respect to vertical within bouquet form 26A. The first bouquet form 26A is then transported by conveyor 22 to the next station, e.g. station B. At station B, a worker rotates bouquet form 26A such that an open stem holding arm 94A-94I and corresponding lower stem receiving portion 120A-120I are oriented towards the worker. Alternatively, conveyor 22 can be provided with means for automatically indexing each bouquet maker 26A-26C at respective stations A-C such that an open stem holding arm 94A-94I and corresponding lower stem receiving portion 120A-120I are oriented towards the worker who will be placing flowers therein. Another worker inserts a second set of bouquet element stems (e.g., 99B) into an open one of the plurality of stem holding arms 94A-94I and into a corresponding lower stem receiving portion 120A-120I of the first bouquet form 26A such that the second set of bouquet element stems 99B is held at an angle with respect to vertical within bouquet form 26A. Preferably, the first and second sets of bouquet elements are comprised of different flowers. For example, one set of bouquet elements can be roses and another set greenery. The plurality of stem holding arms 94A-94I and corresponding lower stem receiving portions 120A-120I may be color coded to help facilitate the loading of flowers into the correct locations.

In addition, a worker places a set of bouquet elements 99C into center post 80 of bouquet form 26A. The above steps are repeated until each of the plurality of stem holding arms 94A-94I and corresponding lower stem receiving portions 120A-120I of the first bouquet form 26A, as well as the center post 80, holds a set of bouquet elements, thereby forming a final bouquet set, such as 168 shown in FIG. 6. The final bouquet set 168 is lifted from the bouquet form 26A by a worker and secured with a fastener 180, such as a ribbon, rubber band or the like, to form a completed twisted-type bouquet having intertwined stems, such as bouquet 182 in FIG. 7. Advantageously, stems 98 of final bouquet set 168 do not need to be twisted, mechanically or by hand, into the correct position for a twisted-type bouquet as they are already correctly aligned by bouquet form 26A. Eliminating manual or mechanical twisting of stems 98 reduces the likelihood of stems 98 being broken or otherwise damaged in the bouquet making process.

In a preferred method, the conveying device includes a bouquet form at each of the plurality of stations, and the above process is repeated for each of the bouquet forms 26A-26C simultaneously. The conveying device rotates each of the bouquet forms 26A-26C from station to station, such that a plurality of bouquets 182 are formed which are substantially identical in design. For example, while bouquet form 26A is at station A, a worker at station B will insert a set of bouquet elements into a second bouquet form 26B. Conveyor 22 then transports bouquet form 26A to station B, and bouquet form 26B to station C. The workers at stations B and C then substantially simultaneously fill a stem holding arm and corresponding lower stem receiving portion of respective bouquet forms 26A and 26B, before conveying bouquet forms 26A and 26B to the next station along conveyor 22. The final set of bouquet elements 168 in each bouquet form 26A and 26B are lifted away from the bouquet forms 26A and 26B and secured to form substantially identical bouquets 182. The resultant bouquets 182 will have twisted and intertwined stems 98 due to the angle of the stems 98 within each bouquet form 26A-C.

Figure 9:
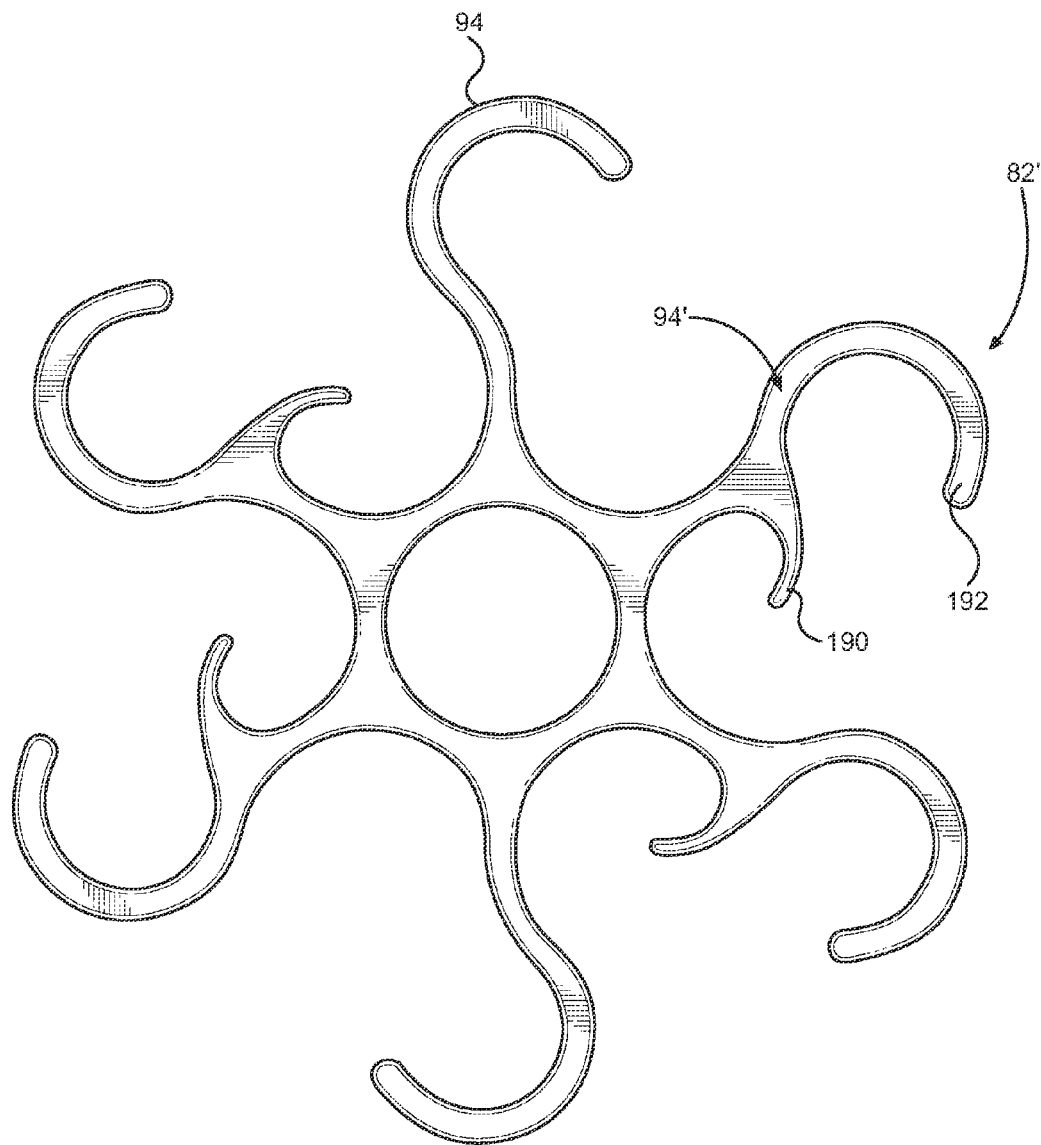
FIG. 9 is a first alternative upper stem support of the present invention.
Figure 10:
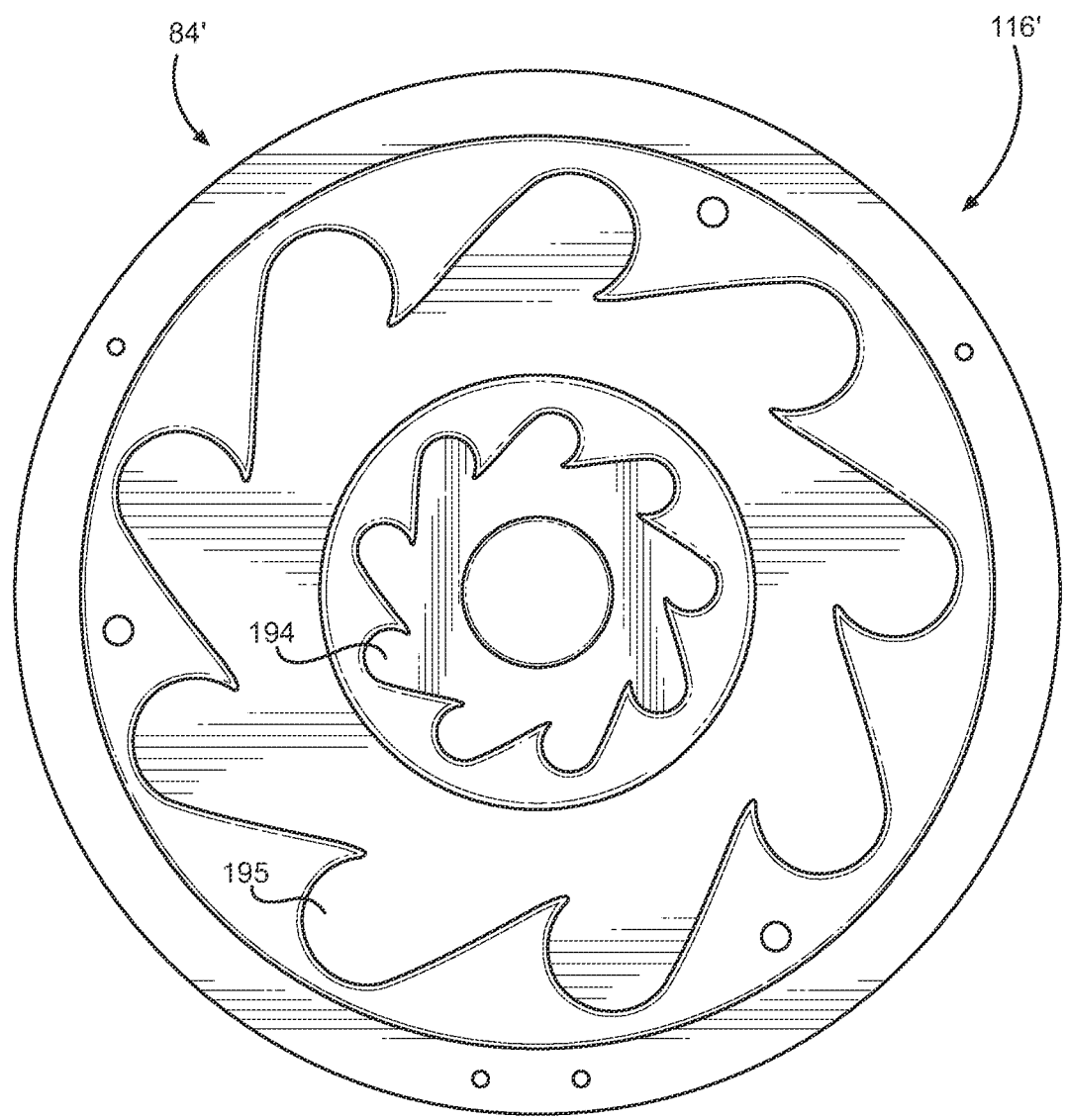
FIG. 10 is an alternative top plate of the present invention.

Advantageously, bouquet forms 26A-26C can be reconfigured by a user in order to provide for a variety of different bouquet arrangements. For example, the relationship of central axes A and B of respective curved portions 96 and curved lobes 120 may be varied to provide for different angles of stems 98. Additionally, upper stem support 82 and top plate 116 can take on different forms to allow for different floral positioning or grouping. For example, FIG. 9 depicts an alternative upper stem support 82' including hook-shaped arms 94' having both inner and outer curved or hook-shaped portions 190 and 192. FIG. 10 depicts an associated top plate 116' of a lower stem support 84', which includes both inner and outer curved lobes 194 and 195. With this configuration, it should be understood that sets of stems 98 can be arranged within each pair of inner curved portions 190 and corresponding inner curved lobes 194, and each pair of outer curved portions 192 and corresponding outer curved lobes 195. Preferably, the inner and outer curved portions 190 and 192 are offset with respect to the corresponding inner and outer curved lobes 194 and 195 such that stems 98 are held at an angle with respect to vertical.

Figure 11:
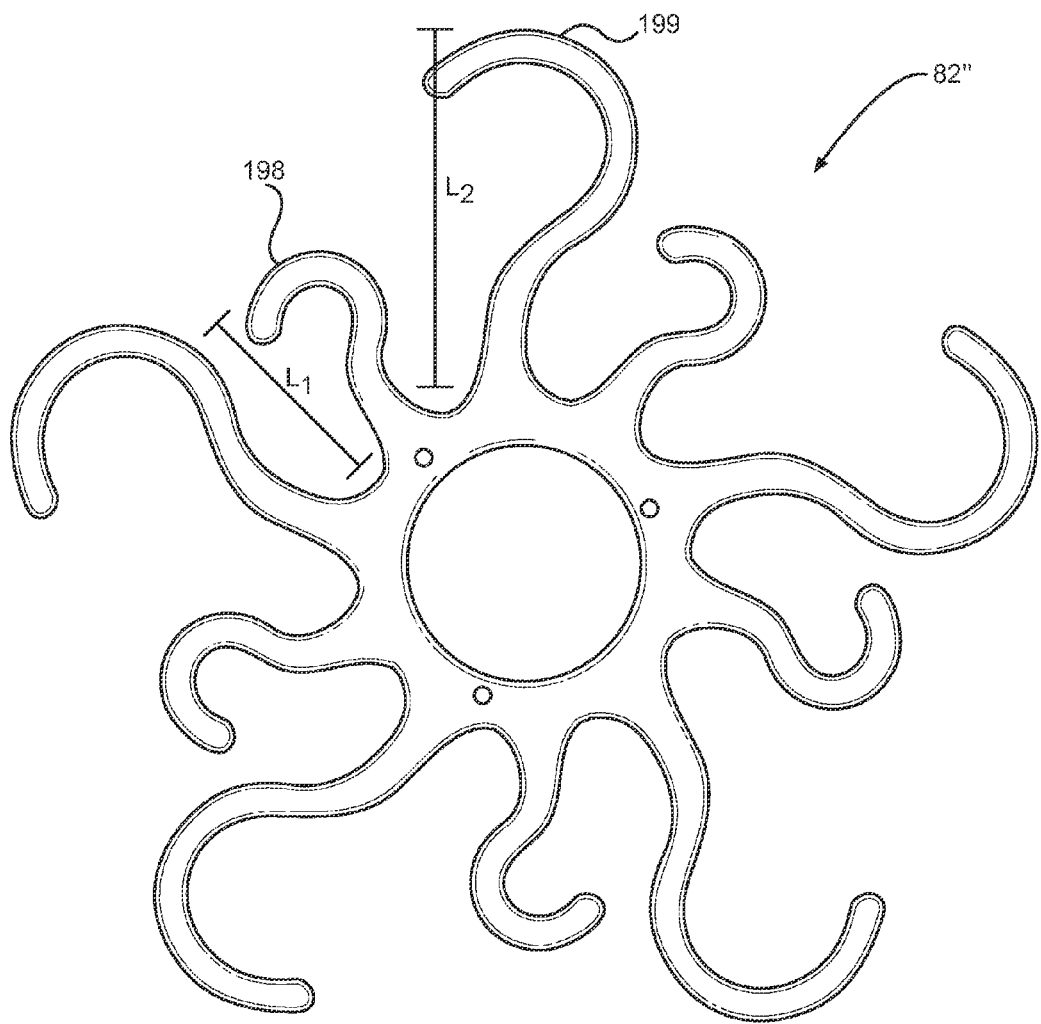
FIG. 11 is a second alternative upper stem support of the present invention.

FIG. 11 depicts yet another upper stem support 82", which includes alternating inner and outer hook-shaped arms 198 and 199, wherein the inner hook-shaped arms 198 have a length $L_1$ which is shorter than the length $L_2$ of the outer hook-shaped arms 199. In use, a set of stems 98 is inserted into each outer hook-shaped arm 199 and into a corresponding outer curved lobe 195 of top plate 116', as well as into each inner hook-shaped arm 198 and corresponding inner curved lobe 194 of top plate 116'.

Figure 12:
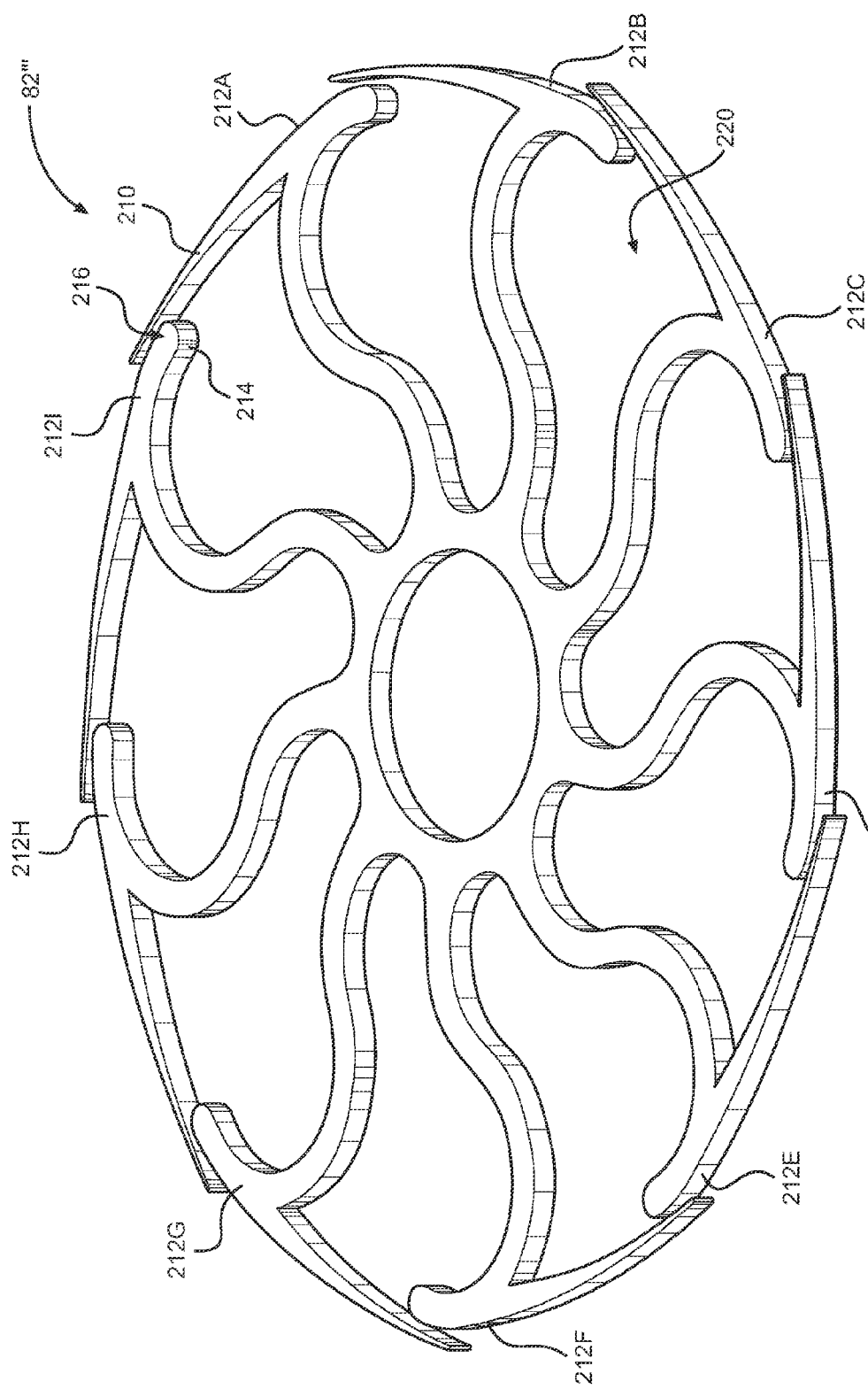
FIG. 12 is a third alternative upper stem support of the present invention.

FIG. 12 depicts a third alternative upper stem support 82'", which includes the same shape as upper stem support 82, with the addition of retention fingers 210, which extend back from the opening of each of a plurality of hook shaped arms 212A-212I. Retention fingers 210 extend slightly beyond a front end 214 of a hook-shaped portion 216 of the succeeding adjacent hook shaped arm. With this configuration, bouquet elements are held within an upper pocket 220 defined by each of the hook-shaped portions 216 and a respective adjacent retention finger 210. It should be readily understood that different bouquet designs can be created by rearranging the elements of bouquet forms 26A-C, as well as by varying the type and number of bouquet elements 99 inserted into each of upper and lower stem supports 82, 82', 82", 82''' and 84, 84'.

Figure 13:
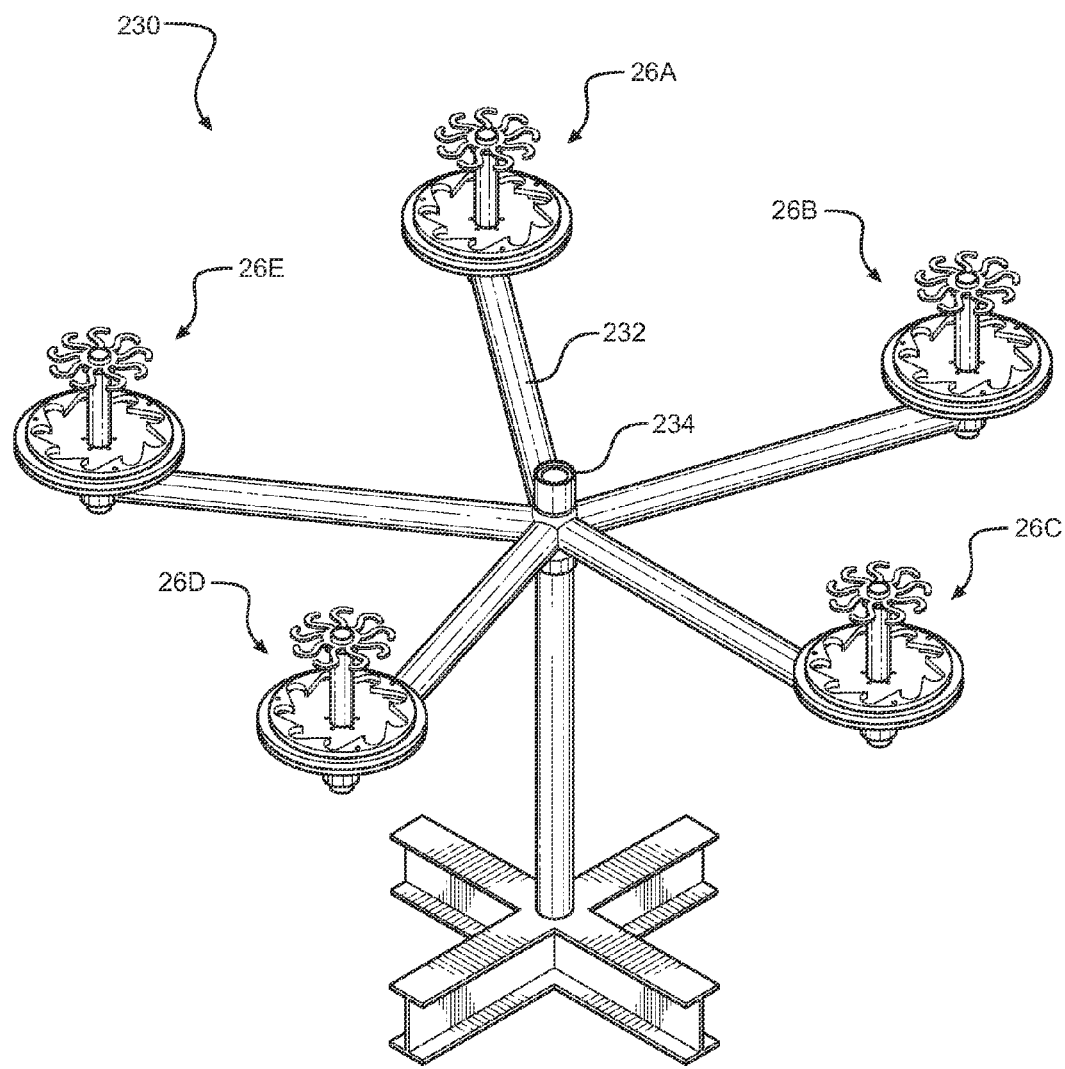
FIG. 13 is an alternative conveying device of the present invention.

Although discussed above with reference to a continuous loop-type conveyor embodiment 22, it should be understood that different types of conveying devices or conveying means for transporting bouquet forms 26A-26E between work stations can be utilized in accordance with the present invention. For example, bouquet forms 26A-26E can be mounted on the belt of a standard belt conveyor for transport between work stations. Alternatively, rotating surfaces can be utilized. In order to illustrate this point, FIG. 13 depicts a second type of conveying device indicated at 230. In general, conveying device 230 includes a plurality of support arms 232 extending from and rotatably supported about a central support 234. Each of the support arms 232 supports a respective bouquet form 26A-26E for movement about central support 234. A standard drive system (not shown) is utilized to spin support arms 232 about central support 234. Alternatively, workers themselves can provide the power to spin support arms 232 about central support 234. With this embodiment, stations are set up along the periphery of conveying device 230, and support arms 232 are rotated from station to station, enabling a worker at each station to insert a set of bouquet element stems into each bouquet form 26A-26E in accordance with the method described above.

Figure 14:
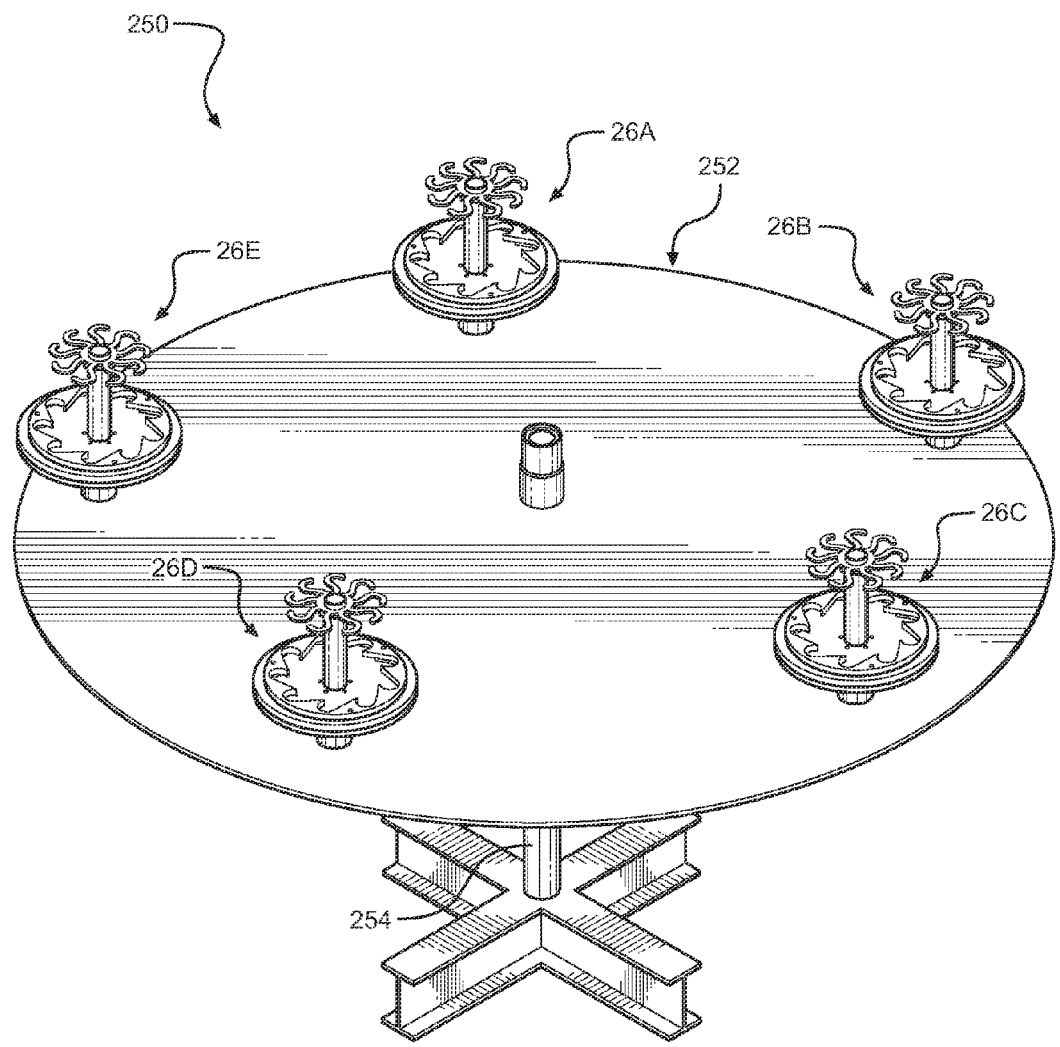
FIG. 14 is another alternative conveying device of the present invention.

In yet another embodiment, a third type of conveying device indicated at 250 is depicted in FIG. 14. In general, conveying device 250 include a circular table 252 rotatably supported about a central support 254. Bouquet forms 26A-26E are mounted at spaced locations along an outer portion of circular table 252. In use, a standard drive system (not shown) is utilized to spin circular table 252 about central support 254 to move bouquet forms 26A-26E between stations. Alternatively, workers themselves can provide the power to spin circular table 252 about central support 254. Thus, it should be understood that various types of conveying devices can be utilized with the bouquet forms and method of the present invention to mass produce substantially identical twisted bouquets 182.

Utilizing multiple identical bouquet forms 26A-26E on the bouquet making devices of the present invention results in the formation of multiple substantially identical bouquets with little or no damage to the stems of the flowers or other bouquet making elements. Advantageously, the bouquet forms and arrangement of bouquet elements can be customized, allowing for a limitless variety of bouquet designs. Thus, the present apparatus and method allow for the customization and mass production of substantially identical twisted bouquets. Although described with reference to preferred embodiments of the invention, it should be readily understood that various changes and/or modifications can be made to the invention without departing from the spirit thereof. For instance, although depicted as having nine stem holding arms 94A-94I and nine corresponding lower stem receiving portions 120A-120I, bouquet forms 26A-26C could be configured with any desired number of stem holding portions. Further, although shown as separate elements, the upper and lower stem supports could be connected to one another. Additionally, it should be understood that a single worker could utilize one or more of the bouquet forms of the present invention, with or without a conveying device. For example, a single worker could utilize one or more bouquet forms mounted to a spinning table, enabling the individual to turn the bouquet form to insert sets of bouquet elements according to the particular bouquet design. In general, the invention is only intended to be limited by the scope of the following claims.

I claim:

1. A method for forming bouquets comprising the steps:
    (a) arranging bouquet elements at each of a plurality of stations spaced along a conveying device, wherein the conveying device includes a first bouquet form having a plurality of hook-shaped stem holding arms extending generally coplanar from a central body, each including a stem holding portion, wherein the central body is spaced from a plurality of lower stem receiving portions, and wherein the plurality of lower stem receiving portions are positioned radially outwardly and extending beyond the stem holding portions;
    (b) at a first of the plurality of stations, inserting a first set of bouquet element stems into one of the plurality of hook-shaped stem holding arms and into a corresponding one of the plurality of lower stem receiving portions of the first bouquet form;
    (c) transporting the first bouquet form to a second of the plurality of stations;
    (d) at the second of the plurality of stations, inserting a second set of bouquet element stems into an open one of the plurality of hook-shaped stem holding arms and into a corresponding lower stem receiving portion of the first bouquet form;
    (e) repeating steps (b)-(d) until a desired number of the plurality of hook-shaped stem holding arms and corresponding lower stem receiving portions of the first bouquet form holds a set of bouquet elements, thereby forming a first final bouquet set; removing the first final bouquet set from the plurality of hook-shaped stem holding arms and corresponding lower stem receiving portions by grabbing stems of the first final bouquet set and lifting the first final bouquet set upward out of the plurality of hook-shaped stem holding arms and corresponding lower stem receiving portions; and
    (g) securing the first final bouquet set with a fastener to form a first bouquet.

2. The method of claim 1, wherein each set of bouquet element stems held by the first bouquet form are held at an angle with respect to vertical, and the bouquet formed is a twisted stem bouquet.

3. The method of claim 1, wherein the conveying device is a rotating table configured to transport the bouquet form between work stations spaced about the rotating table, and wherein the step of transporting the first bouquet form to a second of the plurality of stations comprises rotating the table.

4. The method of claim 1, wherein the conveying device is a continuous loop conveyor and the bouquet form is moveably supported by the conveyor, and wherein the step of transporting the first bouquet form to a second of the plurality of stations comprises actuating a drive belt to transport the bouquet form along the conveyor from the first of the plurality of stations to the second of the plurality of stations.

5. The method of claim 1, wherein the first bouquet form is removably attached to the conveying device such that the first bouquet form can be readily replaced with an alternative bouquet form, the method further comprising:
    removing the first bouquet form from the conveying device and attached an alternative bouquet form in place of the first bouquet form, the alternative bouquet form having a configuration which is different from the first bouquet form and which results in the formation of a second bouquet having a design different from the first bouquet.

6. The method of claim 1, wherein the lower stem receiving portions are located on a lower stem support including a base plate having a plurality of pockets formed therein, and wherein the step of inserting a first set of bouquet stems into one of the plurality of hook-shaped stem holding arms and corresponding one of the lower stem receiving portions includes inserting a lower portion of the first set of bouquet stems into one of the plurality of pockets such that the bouquet stems are supported by said pocket and inserting an upper portion of the first set of bouquet stems through an opening in one of the plurality of hook-shaped arms vertically offset from said pocket such that the upper portion of the first set of bouquet stems is supported by a portion of said hook-shaped arm and the first set of bouquet stems is held by the first bouquet form at an angle with respect to vertical.

7. The method of claim 1, further comprising the step: adjusting the height of the conveyor.

8. The method of claim 1, wherein the plurality of hook-shaped stem holding arms and the plurality of lower stem receiving portions are fixed with respect to one another during use.

9. A method for forming bouquets comprising the steps:
(a) arranging bouquet elements at each of a plurality of stations spaced along a conveying device, wherein the conveying device includes a first bouquet form having a center post, an upper stem support secured to the center post, the upper stem support including a plurality of stem holding arms, and a lower stem support secured to the center post and spaced from the upper stem support, the lower stem support including a base plate having a plurality of lower stem receiving portions, and a sprocket attached about a lower portion of the center post, the sprocket engaging a drive belt of the conveying device such that movement of the drive belt causes movement of the bouquet form about the conveying device;
(b) at a first of the plurality of stations, inserting a first set of bouquet element stems into one of the plurality of stem holding arms and into a corresponding one of the plurality of lower stem receiving portions such that the first set of bouquet elements is supported by the first bouquet form;
(c) actuating the drive belt to cause movement of the first bouquet form from the first of the plurality of stations to a second of the plurality of stations;
(d) at the second of the plurality of stations, inserting a second set of bouquet element stems into an open one of the plurality of stem holding arms and into a corresponding lower stem receiving portion such that the second set of bouquet elements is supported by said first bouquet form;
(e) repeating steps (b)-(d) until a desired number of the plurality of stem holding arms and corresponding lower stem receiving portions of the first bouquet form holds a set of bouquet elements, thereby forming a first final bouquet set;
(f) removing the first final bouquet set from the plurality of stem holding arms and corresponding lower stem receiving portions; and
(g) securing the first final bouquet set with a fastener to form a twisted stem bouquet.

10. The method of claim 9, wherein the first bouquet form is removably attached to the conveying device such that the first bouquet form can be readily replaced with an alternative bouquet form, the method further comprising:
removing the first bouquet form from the conveying device and attached an alternative bouquet form in place of the first bouquet form, the alternative bouquet form having a configuration which is different from the first bouquet form and which results in the formation of a second bouquet having a design different from the first bouquet.

11. The method of claim 9, wherein the step of inserting a first set of bouquet stems into one of the plurality of stem holding arms and corresponding one of the lower stem receiving portions includes inserting a lower portion of the first set of bouquet stems into one of the plurality of lower stem receiving portions such that the bouquet stems are supported by said one of the plurality of lower stem receiving portions and inserting an upper portion of the first set of bouquet stems through an opening in one of the plurality of stem holding arms vertically offset from said one of the plurality of lower stem receiving portions such that the upper portion of the first set of bouquet stems is supported by a curved portion of said stem holding arm and the first set of bouquet stems is held by the first bouquet form at an angle with respect to vertical.

12. The method of claim 9, further comprising the step: adjusting the height of the conveyor.

* * * * *